United States Patent [19]

Yamaguchi et al.

[11] Patent Number: 5,538,750
[45] Date of Patent: Jul. 23, 1996

[54] METHOD OF PRODUCING AN INSTANTLY SOLUBLE TEA POWDER

[75] Inventors: Noriaki Yamaguchi; Rieko Kubota, both of Higasi-Osaka, Japan

[73] Assignee: House Foods Corporation, Osaka, Japan

[21] Appl. No.: 485,770

[22] Filed: Jun. 7, 1995

Related U.S. Application Data

[63] Continuation of Ser. No. 128,714, Sep. 30, 1993, abandoned.

[30] Foreign Application Priority Data

Oct. 13, 1992 [JP] Japan ................................ 4-301739
Apr. 12, 1993 [JP] Japan ................................ 5-108906

[51] Int. Cl.$^6$ ........................... A23F 3/16; A23F 3/22; A23F 3/24
[52] U.S. Cl. ..................... 426/594; 426/385; 426/597
[58] Field of Search .................... 426/594, 597, 426/385

[56] References Cited

U.S. PATENT DOCUMENTS

| | | | |
|---|---|---|---|
| 3,637,398 | 1/1972 | Elerath ................................ | 426/385 |
| 3,652,292 | 3/1972 | Bach et al. ........................... | 426/385 |
| 3,888,859 | 6/1975 | Ponzoni et al. .................. | 426/385 X |
| 3,966,979 | 6/1976 | Katz et al. ........................... | 426/385 |
| 4,324,808 | 4/1982 | Wertheim et al. ................ | 426/385 |
| 4,565,706 | 1/1986 | Wertheim et al. ................ | 426/385 |

OTHER PUBLICATIONS

JPO Abstracts, Abstracting JPO4–121146, Abstract Publication Date Aug. 12 1992.
JPO Abstracts, Abstract JPO2–131543, Abstract Publication Date Aug. 2 1990.
Furia et al, Fenaroli's Handbook of Flavor Ingredients, 1975, 2nd Ed., CRC Press: Cleveland, p. 406.

*Primary Examiner*—Anthony J. Weier
*Attorney, Agent, or Firm*—Oblon, Spivak, McClelland, Maier & Neustadt

[57] ABSTRACT

An object of the present invention is to provide a method of producing an instantly soluble powder quickly dissolving by only pouring hot water or water thereupon in the production of powders including tea and flavorous beverages such as coffee according to vacuum freeze-drying, which comprises, in subjecting a solution having the solids content of 5 weight % or more to vacuum freeze-drying, incorporating a gaseous body of 10 volume % or more therein to form foams at the time of freezing, and then subjecting the mixture to vacuum freeze-drying. Another object of the present invention is to provide a method of producing an instantly soluble powder (an instant tea powder) having almost the same flavor, taste and appearance as those of ordinary tea directly extracted with hot water from tea leaves represented by green tea, brown rice tea, toasted tea, oolong tea and black tea and being excellent in solubility, which comprises subjecting an extract solution from tea leaves to condensation by means of a reverse osmosis membrane, adding and mixing a powder of tea leaves therein, subjecting the obtained mixture to foam-containing freezing, and then freeze-drying it after a adjustment of a particle size of it or adjusting the particle size of it after the freeze-drying.

7 Claims, No Drawings

5,538,750

METHOD OF PRODUCING AN INSTANTLY SOLUBLE TEA POWDER

This application is a continuation of application Ser. No. 08/128,714, filed on Sep. 30, 1993, now abandoned.

BACKGROUND OF THE INVENTION

1. Field of the Invention

The present invention relates to a method of producing an instantly soluble powder; more specifically, it relates to a method of producing an instantly soluble powder according to vacuum freeze-drying.

Further, the present invention relates to a method of producing an instantly soluble powder (an instant tea powder) having an excellent solubility, flavor and taste.

Incidentally, "tea" according to the present invention is defined to include tea, such as green tea, black tea, oolong tea, toasted tea, and brown rice tea.

2. Description of the Prior Art

Conventionally, tea powder, coffee powder and the like have been produced by putting materials such as tea leaves and coffee beans into an extraction tank to extract with hot water, and, after the separation of an extract solution, condensing the extract in the extract solution to a proper concentration, or adjusting the concentration with dextrin or the like, and then drying the resultant product according to spray drying or vacuum freeze-drying. However, they have some problems in flavor when they are drunk in hot water; namely, those with dextrin added therein are given flavors different from the original flavors of tea and coffee, and those dried according to spray drying are poor in flavor which is the special feature of tea and coffee, and particularly a light flavor disappears.

Hence, a method has been devised for the purpose of solving the problems in flavor, which comprises condensing the extract without dextrin, or using the extract solution thickly extracted as it is, and subjecting it to vacuum freeze-drying to produce a powder. However, when hot water is poured onto a tea powder and a coffee powder obtained by freezing a solution as it is and subjecting it to vacuum freeze-drying, they tend to give rise to coagulations, and it is necessary to stir them up to dissolve them in hot water completely. In addition, when water is poured there upon, they hardly dissolve by mixing them up.

One example of prior arts is a method of producing an instant tea (Official Gazette of Japanese Laid-Open Patent Publication No 64-86832/1989) comprising condensing the extract extracted from tea leaves to adjust the concentration to 15 to 60 weight % and freeze-drying it, but the said method comprises giving rise to a specific amount of crystals of ice in a condensate and then freeze-drying it, and solubility is not improved even though it becomes a powder with less foam formation.

The present inventors have developed some techniques for the purpose of solving these problems. For example, the following can be exemplified: an instantly soluble powder (Official Gazette of Japanese Laid-Open Patent Publication No.63-3755/1988) having an excellent flavor and taste, which comprises extract obtained from tea leaves by water extraction, extract obtained from tea leaves by distillation or extraction with a solvent and a powder of tea leaves, a method of producing an instantly soluble powder (Official Gazette of Japanese Laid-Open Patent Publication No.63-94960/1988) having an improved solubility, which comprises subjecting an aqueous solution containing a solids constituent to vacuum freeze-drying incompletely, subjecting it to a dissolving treatment and then subjecting it to vacuum freeze-drying again, and a method of producing a powder being of high quality and instantly soluble (Official Gazette of Japanese Laid-Open Patent Publication No.63-167742/1988), which comprises subjecting a flavorous beverage with less than 5 weight % of the solids content to vacuum freeze-drying, pressing the said dried product, pulverizing it into a powder and, if required, sifting it. The present inventors have continued to make studies upon these techniques and have finally developed a method of producing an instantly soluble powder having an excellent solubility, flavor and taste.

SUMMARY OF THE INVENTION

An object of the present invention is to provide a method of producing an instantly soluble powder capable of dissolving quickly by only pouring hot water or water thereupon, in the production of powders including tea and flavorous beverages such as coffee according to vacuum freeze-drying.

Another object of the present invention is to provide a method of producing an instantly soluble powder (an instant tea powder) having almost the same flavor, taste and appearance as those of ordinary tea directly extracted with hot water from tea leaves represented by green tea, brown rice tea, toasted tea, oolong tea and black tea, and being excellent in solubility.

The present invention has been made on the basis of the finding that a powder easily soluble in hot water can be obtained by incorporating a gaseous body into a green tea extract solution and the like to form foams at the time of freezing (hereinafter, it may be referred to as foam-containing freezing), when the green tea extract solution and the like are subjected to vacuum freeze-drying.

That is, the present invention is a method of producing an instantly soluble powder characterized by, when a solution with the solids content of 5 weight % or more is subjected to vacuum freeze-drying, incorporating a gaseous body of more than 10 volume % into the solution at the time of freezing, and then subjecting it to vacuum freeze-drying.

Besides, it is a method of producing an instantly soluble powder characterized by condensing an extract solution from tea leaves by means of a reverse osmosis membrane to make a solution with the solids content of 5 weight % or more, adding and mixing a powder of tea leaves therein, subjecting the obtained mixture to foam-containing freezing and then freeze-drying it after a adjusting a particle size of a product or adjusting the particle size of it after the freeze-drying.

Incidentally, an instantly soluble powder according to the present invention is not limited to a dried powder of an extract solution but is defined to include a so-called instant tea powder including a powder of tea leaves as a part.

DETAILED DESCRIPTION OF THE INVENTION

Preferable examples of a solution in the present invention include tea, such as green tea, black tea, oolong tea, toasted tea and brown rice tea, and flavorous beverages such as coffee, but it is not particularly limited so far as it is such a solution as its solids constituent is dissolved and dispersed in water and becomes a powder by drying.

When the concentration of the above solution is adjusted according to condensation or the like, it is necessary to make the solids content 5 weight % or more. When the solids content is below 5 weight %, a powder after vacuum freeze-drying becomes cotton-like, and when hot water or water is poured thereupon, the powder floats on the surface of the water and becomes hard to dissolve.

In the present invention, a method of incorporating a gaseous body into a solution at the time of freezing is not particularly limited and, for example, flavorous beverages whose concentrations are adjusted may be freeze-dried with making contact with a gaseous body such as air or nitrogen gas by means of a scraping type of heat exchanger and the like. Specifically, there can be mentioned a method of freezing with incorporating a gaseous body into a solution to form foams by means of an icecreamer, an ice cream producing machine.

When a gaseous body are incorporated into the solution to form foams, it is necessary to make the amount of foams after freezing 10 volume % or more. When the amount of foams is below 10 volume %, functions and effects of a powder such as easily dissolving in hot water or water cannot be obtained.

Hereinafter, the aspect of the present invention is described in detail with green tea as an example. First of all, an extract solution from tea leaves is obtained according to a method comprising pouring water onto tea leaves, heat-treating it and filtering it, a method comprising pouring hot water onto tea leaves and filtering it and the like. In these cases, it is preferable to extract it at a relatively low temperature, for example, at temperatures of 10° to 40° C. By it, components for bitterness and astringency are not so much extracted from tea leaves and savory components can be extracted effectively.

In separating an extract solution from tea leaves after extraction, it must be performed not to break tea leaves. For example, the separation of an extract solution and tea leaves may be carried out according to a method such as pressing and centrifugal separation. By it, the elution of components for bitterness and astringency causing the breakage of tea leaves can be prevented.

The extract solution obtained according to the above method is condensed by means of a reverse osmosis membrane. This condensation by means of a reverse osmosis membrane has advantages that flavor does not disappear and that deterioration due to heat is small since it is not a condensation with heat. However, it is preferable to condense the solution by controlling the temperature to about 25° C. since it takes much time for condensation; hence, if required, the condensation by means of a reverse osmosis membrane is carried out with a cooling treatment.

In the condensation by means of a reverse osmosis membrane, the solids constituent in an extract solution is condensed to a concentration of 5 weight % or more, preferably 10 to 30 weight %. When the concentration of the solids constituent is below 5 weight %, foam-containing freezing becomes hard to perform or it takes much time to freeze-dry and a yield is small; hence production efficiency deteriorates. On the other hand, when the concentration of the solids constituent is too high, the solubility of an instantly soluble powder as a final product deteriorates.

If required, a powder of tea leaves is added and mixed into the thus obtained condensate. The addition of a powder of tea leaves is performed in order to reinforce the taste and flavor of various kinds of tea and improve the appearance, and is applied particularly to green tea.

In order to obtain a powder of tea leaves, various methods of pulverization may be employed. It is desirable to control the deterioration of tea leaves due to heating in pulverization to the utmost and hence it is preferable to employ a method of forming tea leaves into a powder according to freeze-pulverizing or pulverization by means of a stone mill.

With respect to a particle size of a powder of tea leaves, a 20-mesh (840 µm) or less powder and at least 50 weight % of which is 100 mesh (149 µm) or less is used. The amount of it to be used is preferably 0.1 to 20 weight % to an instantly soluble powder as a final product. If the amount is too small, an effect of reinforcing the taste and flavor of tea cannot be anticipated sufficiently, and, on the other hand, if the amount is too large, a sense of incongruity in appearance caused by the powder of tea leaves occurs.

A powder of tea leaves may be added and mixed before or after the condensation of an extract solution, but it is preferable to add and mix it after an extract solution is condensed, from a point of preventing the deterioration of the flavor of tea leaves. In any case, it is desirable to carry out the adding and mixing of a powder before foam-containing freezing. If a powder of tea leaves is added and mixed after it, it becomes difficult to disperse it uniformly.

Subsequently, in the present invention, the above condensate is subjected to foam-containing freezing; regarding green tea, methyl sulfide may be added together with the above powder of tea leaves for the purpose of further reinforcing the taste and flavor of tea before it. Methyl sulfide is added preferably in an amount of 30 to 600 mg/100 g to a final product. If the amount of it to be added is too small, an effect of adding methyl sulfide cannot be anticipated so much; on the other hand, if the amount of it to be added is too large, the smell of methyl sulfide becomes too strong and causes an unpleasant smell inversely.

When a condensate is subjected to foam-containing freezing, it may be carried out according to a method of incorporating a gaseous body at the time of freezing or a method of freezing after allowing the condensate to contain foams. In carrying out foam-containing freezing, it is preferable to allow the condensate to contain foams at a temperature below the melting point of methyl sulfide to freeze it quickly since it prevents the disappearance of methyl sulfide. In addition, a preferable temperature of freezing is a complete freezing temperature or below it, for example, below −30° C.; when a temperature is too high, it causes poor drying and foam formation at the time of vacuum freeze-drying.

A method of incorporating gaseous body into a solution to form foams at the time of freezing is not particularly limited; for example, an extract solution with an adjusted concentration may be cool-frozen with making contact with a gaseous body such as air or nitrogen gas by means of a scraping type of heat exchanger and the like. Specifically, there can be mentioned a method of freezing a solution with incorporating a gaseous body therein by means of an icecreamer, an ice cream producing machine. In freezing a condensate after allowing it to form foams, since it has a viscosity of some extent, foam-forming necessary for foam-containing freezing can be performed by stirring it strongly. The foam-containing state is maintained by quick freezing after foam-containing.

It is necessary that the amount of foams after freezing is more than 10 volume %. When the amount of foams is below 10 volume %, sufficient functions and effects cannot be anticipated in easy solubility.

After a condensate is subjected to foam-containing freezing, it may be subjected to vacuum freeze-drying after its particle size is adjusted, or its particle size is adjusted after it is subjected to vacuum freeze-drying. The former is suitable for obtaining rough particles and the latter is suitable for obtaining fine particles. It is preferable to employ the former in a point of easy solubility. In case of the former, on the other hand, when a finely divided powder occurs, the occurrence of it can be reduced to the utmost by recycling it into a condensate condensed by means of a reverse osmosis membrane.

As a specific method of the former, it is carried out in such a method as foams do not become flat at the time of adjusting a particle size like freezing pulverization. If foams become flat at the time of adjusting a particle size, the solubility of a final product after vacuum freeze-drying may decrease. As a specific method of the latter, it is not particularly limited but may be carried out according to an ordinary method.

Next, Experiment conducted about the relation between ratios of foams incorporated and solubilities is described.

Experiment

As Experiment is shown in Table 1 the relation between ratios of foams incorporated in each concentration of the solids constituent of an extract solution of green tea at the time of freeze-drying and solubilities of dried powders. The adjustment of ratios of foams incorporated was carried out as below. An extract solution of green tea was put into a desk-top icecreamer (Mister Chef, manufactured by Aikosha Seisakusho) and cooled with stirring; after crystals of ice began to form, a ratio of foams incorporated increased with time, and sampling was performed at regular intervals. A ratio of foams incorporated of each sample was calculated according to the following equation, by putting a sample into a 10-cc vessel, from the weight. After then, it was frozen quickly and a dried powder was obtained by freeze-drying.

The results shown in Table 1 could be obtained according to the following equation, in which a ratio of foams incorporated was represented by a (%), a weight of 10 cc of a sample by b (g) and a weight of 10 cc of a solution having the same concentration of the solids constituent as a sample by c (g).

$$a = \frac{c - b}{c} \times 100$$

TABLE 1

Relation between Ratios of Foams Incorporated and Solubilities

| concentration of solids constituent (weight %) | Ratio of foams incorporated volume %) | | | | |
|---|---|---|---|---|---|
| | 0 | 10 | 20 | 30 | 40 |
| 30 | x | x | x | x | ○ |
| 25 | x | x | x | ○ | ○ |
| 20 | x | x | ○ | ○ | ○ |
| 15 | x | ○ | ○ | ○ | ○ |
| 10 | x | ○ | ○ | ○ | ○ |
| 5 | x | ○ | ○ | ○ | ○ |

○: Completely disolved.
x: Insoluble coagulations remained.

As is apparent from Table 1 above, it is necessary to adjust an amount of foams after freezing to more than 10 volume %.

EXAMPLES

Next, the present invention is described specifically according to Examples and Comparative Example.

Example 1

40 kg of water were added onto 3.5 kg of green tea leaves, and the mixture was extracted for 30 minutes and squeezed by pressing to obtain extract having a concentration of the solids constituent of 1.5 weight %. After the obtained extract was condensed to a concentration of the solids constituent of 20 weight % according to condensation by means of a reverse osmosis membrane, the solution was frozen to an ice cream state with incorporating foams of 40 volume % by means of a continuous icecreamer (a scraping heat exchanger). Subsequently, the product was frozen completely in a freezer (−40° C.), and after it was pulverized and a particle size was adjusted, it was freeze-dried to produce a green tea powder. 100 ml of hot water of 80° C. and water of room temperature (25° C.) were poured into teacups each charged with 0.5 g of the obtained green tea powder. Those into which hot water was poured dissolved quickly and those into which water was poured also dissolved relatively easily.

Comparative Example 1

The extract of green tea having a concentration of the solids constituent of 20 weight % obtained in the same manner as in Example 1 was frozen completely as it was in a freezer (−40° C.), and after it was pulverized and a particle size was adjusted, it was freeze-dried to produce a green tea powder. 100 ml of hot water of 80° C. and water of room temperature (25° C.) were poured into teacups each charged with 0.5 g of the obtained green tea powder. Those into which hot water was poured gave rise to coagulations and did not dissolve without stirring and those into which water was poured did not dissolve at all.

Example 2

After 7 kg of green tea leaves were extracted with 70 kg of water of 20° C. for 30 minutes, tea leaves and the extract solution were separated by pressing so that tea leaves might not be broken. The insoluble solids constituent was removed from the extract solution obtained according to the present method by a continuous centrifugal separator to produce 55 kg of an extract solution having a concentration of the soluble solids constituent of 2 weight %. The extract solution was condensed according to condensation by means of a reverse osmosis membrane under the following treating conditions.

The condensation treatment was carried out by setting a RO membrane NTR-759HR (membrane area: 1.8 m²) onto a test unit device RUW-5 manufactured by Nitto Denko Co., Ltd.

50 kg of the above-obtained extract solution were dehydrated to 5 kg and condensed to a concentration of the solids constituent of 20 weight %. Into 500 g of the condensate were added and mixed 5 g of a 100-mesh (149 μm) or less green tea powder, and the mixture was formed into a semi-frozen state product having a foam-containing ratio of 45 volume % by means of a desk-top icecreamer (Mister Chef, manufactured by Aikosha Seisakusho) and it was spread on an aluminum tray in a thickness of about 5 mm in a form of a plate and frozen completely in a freezer of −40° C.

Subsequently, it was pulverized by a roll type freezing particle-size-adjuster in a freezer of −40° C. and sifted to a 7 (2830 μm) to 32-mesh (500 μm) powder. The resultant frozen product with an adjusted particle size was subjected to vacuum freeze-drying at a degree of vacuum of 10 pascals, at a heating temperature of 30° C. over 16 hours to produce about 100 g of an instant green tea powder of rough particles having a moisture content of 1.5 weight %.

The instant green tea powder obtained according to the present method was put into a teacup and hot water was poured thereupon. It dissolved quickly and had almost the same flavor and taste as those of genuine green tea directly extracted from tea leaves. A slight amount of a powder of tea leaves precipitated at the bottom of the teacup and hence it had an appearance of genuine green tea.

Example 3

An instant green tea powder was obtained in the same procedure as in Example 2 except that 100 mg of methyl sulfide were added into 500 g of a condensate of 20 weight % of an extract solution. The instant green tea powder obtained according to the present method was more excellent in both flavor and taste than that obtained according to the method of Example 2.

Example 4

After 10 kg of toasted tea were extracted with 60 kg of hot water of 40° C. for 30 minutes, tea leaves and the extract solution were separated by means of a basket centrifugal separator so that tea leaves might not be broken. The insoluble solids constituent was removed from the extract solution obtained according to the present invention by a filter of 10 μm to produce 45 kg of an extract solution having a concentration of the soluble solids constituent of 2.5 weight %. 40 kg of the extract solution was dehydrated to 5 kg and the concentration of the solids constituent was condensed to 20 weight % according to condensation by means of a reverse osmosis membrane in the same manner as in Example 2.

After 1 g of a 50-mesh (297 μm) or less toasted tea powder was added and mixed into 500 g of the condensate, foam-containing freezing, complete freezing, freezing and adjusting of a particle size, and vacuum freeze-drying were carried out in the same manner as in Example 2 to obtain 100 g of an instant toasted tea powder of rough particles having a moisture content of 2.0 weight %.

The instant toasted tea powder obtained according to the present method was put into a teacup and hot water was poured thereupon.

It dissolved quickly and had almost the same flavor and taste as those of genuine toasted tea directly extracted from tea leaves. A slight amount of a powder of tea leaves precipitated at the bottom of the teacup and hence it had an appearance of genuine toasted tea.

Example 5

After a condensate of green tea obtained in the same procedure as in Example 2 was formed into a foam-containing, frozen product having a foam-containing ratio of 45 volume %, it was frozen completely on an aluminum tray and subjected to vacuum freeze-drying as it was to obtain a dried product having a moisture content of 1.5 weight %. Subsequently, the dried product was pulverized to a 20-mesh (840 μm) or less powder by means of a pulverizer to produce an instant green tea powder.

The instant green tea powder obtained according to the present method was put into a teacup and hot water was poured thereupon. It dissolved almost quickly though a little poor in solubility in comparison with that obtained according to the method of Example 2 and it had almost the same flavor and taste as those of true green tea directly extracted from tea leaves. A slight amount of a powder of tea leaves precipitated at the bottom of the teacup and hence it had an appearance of true green tea.

As described in detail above, while conventional, instantly soluble powders produced according to vacuum freeze-drying have been hard to dissolve without stirring after pouring hot water thereupon, powders produced according to the method of production of the present invention easily dissolve by only pouring hot water thereupon and dissolve also in water far more easily than conventional ones.

In addition, according to the method of the present invention can be obtained instantly soluble powders having almost the same flavor, taste and appearance as ordinary tea extracted from tea leaves with hot water and being excellent in solubility. Regarding green tea, the taste and flavor can be further improved by the addition of dimethyl sulfide in the process of production.

We claim:

1. A method for producing an instantly soluble green tea powder, comprising the steps of:

a) incorporating at least 10 volume % of a gaseous body into a solution of green tea having a solids content of at least 5 weight % during freeze drying of said solution to form foams and to provide a mixture, and b) subjecting the mixture obtained in a) to vacuum freeze-drying, wherein at least 20 volume % of said gaseous body is incorporated in solutions having a solids content of at least 20 wt. %, at least 30 volume % of said gaseous body is incorporated in solutions having a solids content of at least 25 wt. %, and at least 40 volume % of said gaseous body is incorporated in solutions having a solids content of at least 30 wt. %.

2. The method of producing an instantly soluble powder according to claim 1, wherein said solution is an extract solution from green tea leaves having a solids content of 5 weight % or more according to condensation obtained by means of a reverse osmosis membrane and comprising a powder of green tea leaves.

3. The method of producing an instantly soluble powder according to claim 1, in which the said vacuum freeze-drying is performed after the adjustment of a particle size of a product or the adjustment of a particle size of a product is performed after the vacuum freeze-drying.

4. The method of producing an instantly soluble powder according to claim 2, in which the solids content of the extract solution is adjusted to 10 to 30 weight % according to condensation by means of a reverse osmosis membrane.

5. The method of producing an instantly soluble powder according to claim 2, in which the powder of green tea leaves has a 20-mesh (840 μm) particle size or less and at least 50 weight % of said powder of tea leaves has a 100-mesh (149 μm) particle size or less.

6. The method of producing an instantly soluble powder according to claim 2, further comprising the addition of methyl sulfide.

7. The method of producing an instantly soluble powder according to claim 6, in which the amount of methyl sulfide added is 30 to 600 mg/100 g of final product.

* * * * *